J. T. TWIFORD.
TRACTOR ATTACHMENT FOR MOTOR VEHICLES.
APPLICATION FILED MAY 24, 1915.

1,173,064.

Patented Feb. 22, 1916.

Witnesses

Inventor
J. T. Twiford.
By
Attorney

UNITED STATES PATENT OFFICE.

JOHN T. TWIFORD, OF OSHKOSH, NEBRASKA.

TRACTOR ATTACHMENT FOR MOTOR-VEHICLES.

1,173,064.

Specification of Letters Patent.

Patented Feb. 22, 1916.

Application filed May 24, 1915. Serial No. 30,173.

*To all whom it may concern:*

Be it known that I, JOHN T. TWIFORD, a citizen of the United States, residing at Oshkosh, in the county of Garden and State of Nebraska, have invented certain new and useful Improvements in Tractor Attachments for Motor-Vehicles; and I do hereby declare the following to be a full, clear, and exact description of the invention, such as will enable others skilled in the art to which it appertains to make and use the same.

This invention relates to new and useful improvements in tractor attachments for motor vehicles and the principal object of the invention is to provide an attachment which will readily convert the usual driving mechanism of motor vehicles into a tractor driving mechanism.

Another object of the invention is to provide a device which is readily attachable after the rear wheels have been removed.

Still another object of the invention is to provide a novel means for converting the driving mechanism into that of a tractor without materially changing the construction of the vehicle in any way.

With these and other objects in view, the invention consists in the novel combination and arrangement of parts which will be fully set forth in the following specification and accompanying drawings, in which:—

Figure 1:
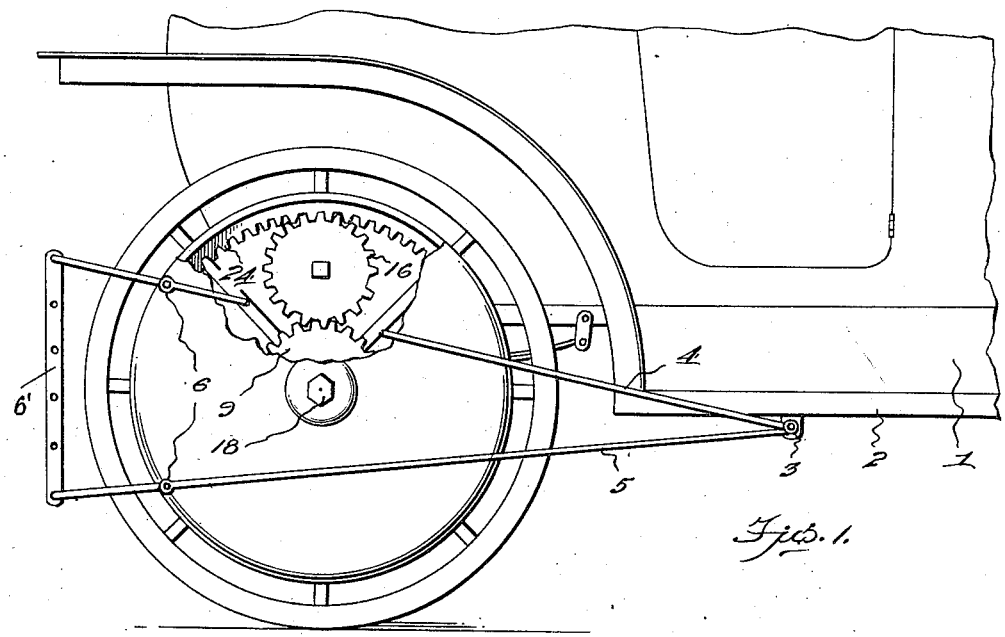
Figure 2:
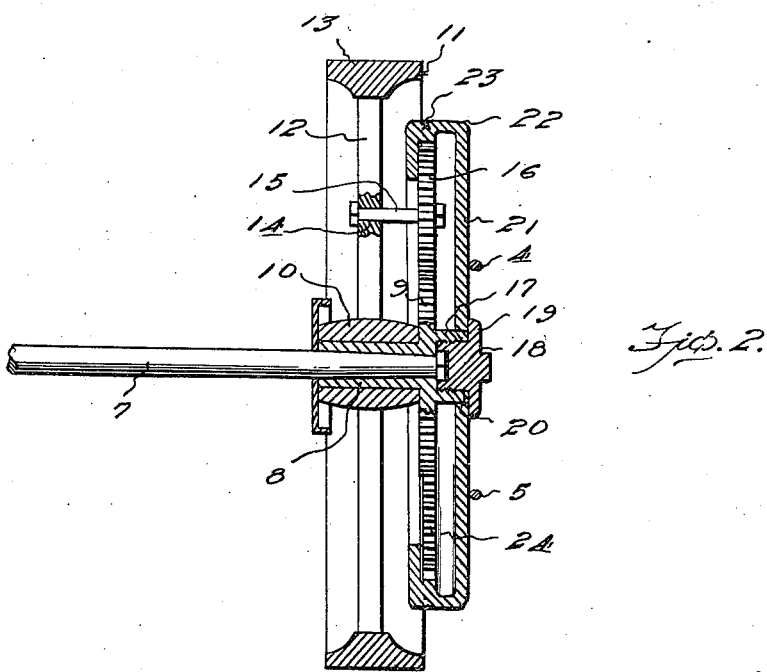

Figure 1 is a fragmentary side view in elevation of the rear end of the motor vehicle showing this improved tractor applied thereto, and Fig. 2 is a vertical sectional view through the tractor attachment.

Referring now to the drawing by characters of reference, the numeral 1 designates the body of the vehicle provided with the usual running board 2, which running board carries an attaching ear 3 on its under side as clearly shown in Fig. 1. This ear 3 has attached thereto the arms 4 and 5, the opposite ends of which diverge and are provided with suitable eyes 6, for the reception of suitable bolts by means of which the bar 6' is supported. In order to hold the fulcrum wheel against movement, the rods 4 and 5 are also attached thereto and support the same against rotation.

In applying the attachment, the rear wheel of a vehicle is removed from the axle 7 and the sleeve 8 is slipped in place on the end of the axle on which the wheel was secured. This sleeve is mounted rigidly on the axle and carries at its outer end the spur gear 9, the use of which will appear as the description proceeds. Rotatably mounted on the sleeve 8 is the hub 10 of the tractor wheel designated generally by the numeral 11 and radiating from the hub are the the spokes 12 carrying at their outer extremities, the rim 13. Suitable openings 14 are formed in these spokes for the reception of the studs 15 on which the planetary drive gears 16 are rotatably mounted. These gears mesh with the gear 9 as clearly shown in Fig. 2 and also mesh with the teeth of the fulcrum wheel hereinbefore referred to.

Extending outwardly from the wheel 9 is a suitable internally screwthreaded collar 17 in which the cap 18 is threaded. This cap 18 is formed with a flange 19 which coöperates with the annular bearing surface 20 of the collar 17 on which the fulcrum wheel 21 is mounted. The peripheray of this fulcrum wheel is inturned as at 22 and then turns back upon itself as at 23 and provided with suitable gear teeth 24 which mesh with the planetary drive gear 16 as clearly shown in the drawing. The eyes 6 of the connecting rod 4 are secured near the periphery of the wheel 21 and it will thus be seen that the said wheel will be held against rotation when the car is in motion.

From the foregoing it will be apparent that when in use, the axle 7 is turned in the usual way and it will thus rotate the gear 9 within the hub 10 of the wheel 11. The rotation of the wheel 9 however, will cause the planetary spur gears 16 to revolve on their spindles or studs 15 and this revolution will cause the studs to travel in a circular path as the gears 16 mesh with the teeth 24, thereby applying the power near the periphery of the traction wheel 11 and driving the vehicle. It will thus be seen that a considerable increase of driving power is provided and a traction wheel which may be easily and quickly applied to motor vehicles of the ordinary construction is provided.

While in the foregoing there has been shown and described the preferred embodiment of this invention, it is to be understood that such changes may be made in the combination and arrangement of parts as will fall within the spirit and scope of the appended claims.

What is claimed is:—

1. A device of the character described including the combination with a drive shaft on a motor vehicle, a sleeve mounted thereon, a drive gear at the outer end of the sleeve, a fulcrum wheel mounted on the outer end of the sleeve exteriorly of the drive gear, said fulcrum wheel being provided with an inturned peripheral flange, teeth on the flange, a drive wheel rotatable on the sleeve, studs carried by said wheel, planetary gears mounted on the studs said gears meshing with a drive gear and with the teeth on the fulcrum wheel and means to hold the fulcrum wheel against rotation.

2. In combination with a motor vehicle having a drive shaft, a sleeve mounted thereon and rotatable therewith, a drive wheel independently rotatable on the sleeve, a fulcrum wheel independently mounted at the outer end of the sleeve and provided with an inturned flange having a series of teeth on the inner side thereof, a drive gear integral with the sleeve, planetary gears meshing with the drive gear and with the gear teeth on the flange, means connecting the planetary gears to the drive wheel, bars connected to the fulcrum wheel and secured at the forward end to the body of the vehicle on which the device is used to hold said fulcrum wheel against rotation.

3. In a device of the class described, the combination with a motor vehicle having a body and a drive shaft, a sleeve secured to said drive shaft, a drive wheel independently rotatable on the sleeve, a gear at the outer end of the sleeve formed integral therewith, a fulcrum wheel rotatably mounted at the outer end of the sleeve, planetary gears meshing with the drive gear and secured to the drive wheel, a ring gear carried by the fulcrum wheel and meshing with the planetary gears, bars secured to the body of the vehicle and attached to the fulcrum wheel, extensions at the rear ends of the bars and a connecting rod adapted to hold the bars in adjusted position.

4. A traction attachment for motor vehicles including a fulcrum wheel, a drive wheel, a planetary gear carried by the drive wheel, a ring gear carried by said fulcrum wheel and meshing with the planetary gear, and a drive gear meshing with the planetary gear whereby when the drive gear is rotated, the planetary gear will revolve around the fulcrum wheel and thereby cause the drive wheel to be driven.

In testimony whereof I affix my signature in presence of two witnesses.

JOHN T. TWIFORD.

Witnesses:
R. S. LAYCOCK,
N. W. GUMAER.